Figure 1:
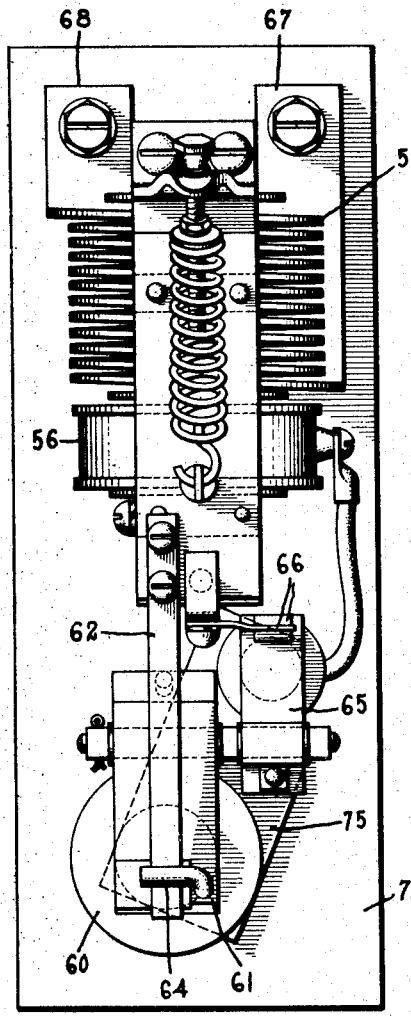

J. F. TRITLE.
MOTOR CONTROL.
APPLICATION FILED JUNE 6, 1919.

1,412,636.

Patented Apr. 11, 1922.
2 SHEETS—SHEET 1.

Inventor:
John F. Tritle,
by *Albert E. Davis*
His Attorney.

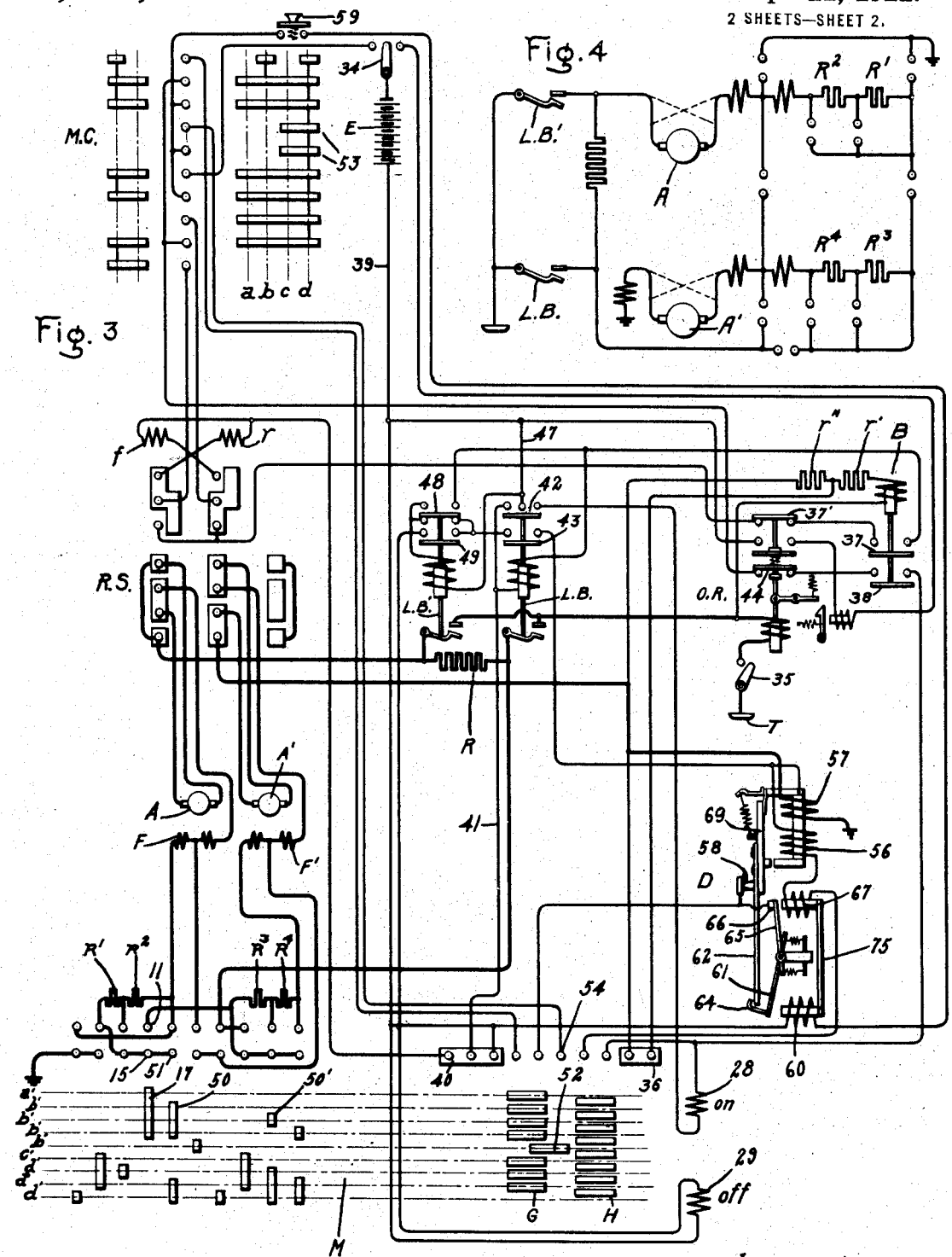

UNITED STATES PATENT OFFICE.

JOHN F. TRITLE, OF SCHENECTADY, NEW YORK, ASSIGNOR TO GENERAL ELECTRIC COMPANY, A CORPORATION OF NEW YORK.

MOTOR CONTROL.

1,412,636.  Specification of Letters Patent.  Patented Apr. 11, 1922.

Application filed June 6, 1919. Serial No. 302,246.

*To all whom it may concern:*

Be it known that I, JOHN F. TRITLE, a citizen of the United States, residing at Schenectady, in the county of Schenectady, State of New York, have invented certain new and useful Improvements in Motor Controls, of which the following is a specification.

My invention relates to the control of electric motors and it provides improved means whereby the motors are started and stopped and generally controlled in a safe, reliable and efficient manner.

More particularly, my invention relates to systems of motor control wherein the motors are automatically accelerated at a speed determined by the current taken by the motors, and it provides improved means whereby the acceleration of the motors is effected automatically in accordance with the current taken by the motors or the acceleration is effected at the will of the operator irrespective of the current taken by the motors, as desired.

One of the objects of my invention is to provide a system of the character indicated which shall be simple in arrangement and effective and reliable in operation.

In order to accelerate electric motors smoothly and without taking an excessive current from the source of supply, it is customary to provide automatic control arrangements whereby the motors increase in speed step by step in accordance with the motor current, and whereby the automatic acceleration is arrested at each step until the motor current has dropped to a predetermined value. The well known current limit throttle is ordinarily provided for effecting such an automatic progression under the control of the motor current. However, abnormal service conditions, such as are encountered by heavy grades where the motors are used to drive a car or locomotive, make it advisable that the motor controller be advanced even though the current on any definite step in the progression has not dropped to the predetermined value, and my invention provides improved means including an improved current limit throttle, sometimes called a "notching relay", whereby the resistance governing switches ordinarily provided for effecting the acceleration of the motors may be independently and successively closed at the will of the operator by short-circuiting the throttle contacts temporarily. I provide that the motor controller can advance one step in response to the short-circuiting of the throttle contacts and prevent the motor controller from completing the progression or resuming the automatic operation until the operator desires. By means of the provision of my improved notching relay, the motor controller can be advanced one step and one only irrespective of the motor current, the notching-up being taken away from the notching relay and thus made independent thereof until the operator desires to restore it, thereby combining all the advantages of manual control with the advantages of automatic control. Since the arrangement is such that the operator must release the mechanism which short-circuits the throttle contacts, and therefore temporarily at least restore control to the throttle before another step can be taken, it is practically impossible to obtain an excessively high rate of notching by means of the manual control. For a better understanding of my invention and further objects which I have obtained, reference is had to the following description taken in connection with the accompanying drawings.

Figure 2:
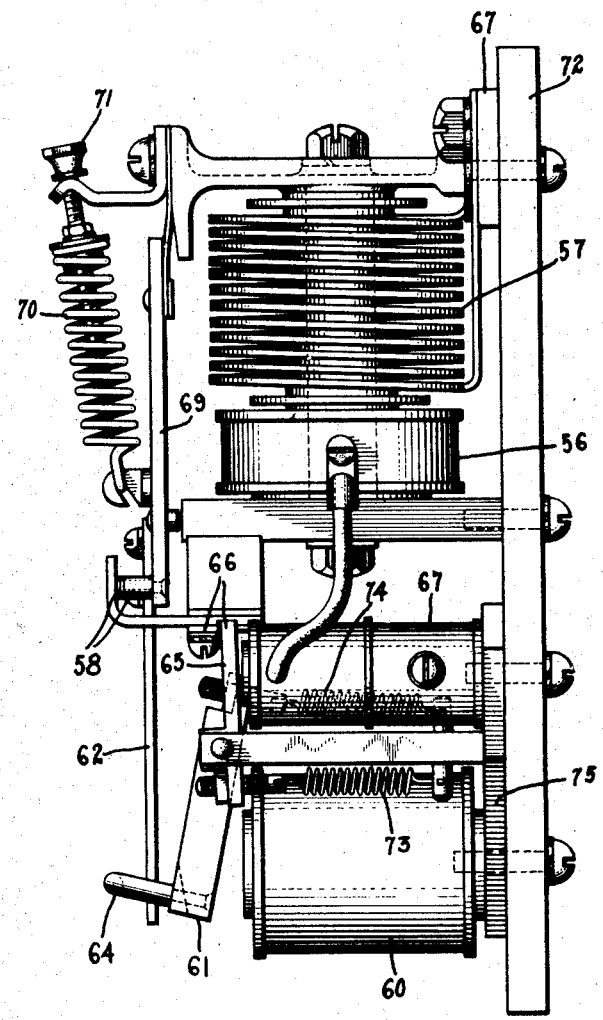

In the accompanying drawings illustrating my invention, Fig. 1 is a front elevation of my improved notching relay; Fig. 2 is a side elevation of the same; Fig. 3 is a diagram of a motor control system embodying my invention; and Fig. 4 is a simplified diagram showing only the motor circuits.

For the sake of an easy understanding of my invention, I have shown it embodied in a system of control described and claimed in my Patent No. 1,310,040, dated July 15, 1919.

Referring to Figs. 1 and 2, the notching relay comprises a large wire coil 57 having terminals 67 and 68 respectively. This coil is in series with the motor armatures and energized responsively to the motor current wound on the same core as the series coil 57 is a shunt coil 56 which is adapted to assist the series coil 57 to positively attract the armature 69. When the motor controller starts to take a step, the two coils 57 and 56 cooperate in the manner set forth in my Patent No. 1,310,040, dated July 15, 1919. The armature 69 is biased to the unattracted position to close the circuit making contacts 58 by means of the spring 70, the pull of which may be varied by means of the adjusting screw 71. Mounted on the same base 72 as the coils 56 and 57 are the coils 60 and 67 which are provided for effecting the short-circuiting of the contacts 58. Cooperating with the coil 67 is an armature 65 which is biased to the unattracted position by means of the spring 73 so as to close the circuit making contacts 66. Cooperating with the coil 60 is an armature 61 having a hook 64, the armature 61 being biased to the unattracted position by means of the spring 74. The coils 67 and 56 are connected in series relation and the coil 60 is adapted to be independently energized at the will of the operator so as to attract the armature 61 and by reason of the hook 64 making engagement with the extension 62 of the armature 69 to complete a short-circuit around the contacts 58 so as to cause the controller to take a complete step regardless of the value of the motor current. Thus, in case the motor current is above the value at which the armature 69 is permitted to move to its unattracted position and thus close the contacts 58 so as to permit the motor controller to advance another step, the short-circuit around these contacts, including the contacts 66, armature 65, magnet frame 75, armature 61, hook 64 and extension 62 of the armature 69, permits the motor controller to advance another step regardless of the motor current. However, but one step can be taken, as will be pointed out later when the operation of my invention is explained. It will be observed that when the coil 60 is energized, the metallic plate 75 which joins the pole pieces on which the coils 60 and 67 are wound provides a shunt path for a sufficient part of the flux set up by the coil 60 whereby the armature 65 will be maintained in the attracted position if it has been previously moved to the attracted position by the energization of the coil 67, even after the coil 67 is deenergized. This provides an arrangement as will be later explained fully when the operation of my invention is explained, whereby but one step at a time may be taken through the energization of the coil 60 to shunt the contacts 58.

Looking at Figs. 3 and 4, it will be noted that I have shown a series-parallel system of motor control in which two motors are employed. It will be understood, however, that my invention is in no sense limited to the particular system employed or to the number of motors controlled. The armatures of the two motors are designated A and A' while the fields which are subdivided as hereinafter described are designated F and F'. RS designates the reversing switch as a whole, MC indicates the master controller, and LB and LB' represent the two line breakers. B represents a potential relay which is deenergized so as to return the controller to the off position upon the failure of power. OR represents an overload relay, D represents a current-limit relay or throttle, for causing the advance of the main controller to be under the control of the motor current and E represents a battery for energizing the control circuits.

The main controller, which I have designated M, as shown in Fig. 3, consists of a number of cams arranged upon a shaft so as to close the contactors in a predetermined order. Forming a part of the controller and rotated with the cam shaft are two sets of contacts G and H, the purpose of which will be hereinafter described. Any suitable motor for operating the main controller may be used, and for purposes of an easy understanding of my invention it will be assumed that an electropneumatic motor such as shown in Fig. 2 of the U. S. patent to Frank E. Case, No. 1,221,676 is used.

As shown, all the parts are in the positions which they assume when all circuits are deenergized. Assuming now that it is desired to start the motors, the switches 34 and 35 are first closed, switch 34 being closed on its left-hand contact. The closure of the switch 35 energizes the potential relay B having contacts 37 and 38 from the trolley T to the winding of the relay, through resistance $r'$ to bridging contact 36 on the main controller, and thence to ground. If, now, the master controller MC is moved to the first position, $a$, the reversing switch will be operated by the energization of the electromagnet $f$ in case the reverser should be in the wrong position. As shown, however, the reverser has been left in the forward position so that there is no change with reference to this switch. The line breaker LB now closes, being energized from the battery, through the conductor 39, the contact 40 on the main controller, conductor 41, contact 37 on the potential relay and contact 37' on the overload relay, through contacts on the reversing switch and the master controller back to the battery. The line breaker therefore closes but does not close the motor circuit. The line breaker is provided with two interlocking contacts 42 and 43. The closing of the contact 42 by the closing of the line breaker energizes the magnetizing winding of electromagnetic valve 28, which I shall call the "on" magnet, the circuit being from the battery through the interlocking contact 40 through interlocking contact 42, winding 28, thence through interlocking contacts 38 and 44, back to the battery through the master controller. The energization of the "on" magnet while the "off" magnet valve 29 is deenergized, causes the cam shaft to move one step, as will be understood from a consideration of the U. S. patent to Case 1,221,676, previously referred to. This has the effect of closing the contacts 11 and 15 through the agency of the cam 17. The motor circuit will now be closed from the trolley T through the switch 35 and the winding of overload relay OR, the contacts of line breaker LB, through resistance R, through the contacts on the reversing switch RS, armature A, two sections of field winding F, through the resistance R', R², contacts 11 and 15, resistances R³ and R⁴, through the two sections of field winding F' and the contacts on the reversing switch, armature A', thence to the series coil 57 of the throttle or relay D and to ground. The closing of the motor circuit therefore is effected at the contacts 11 and 15 of one of the unit switches. The motors will now run in series with all the resistance in circuit.

When the master controller is moved to position $b$, the line breaker LB' will be closed, the circuit being from battery, through wire 47, interlocking contact 48, interlocking contact 43 on line breaker LB, through the contacts 58 controlled by the throttle magnet D and through one of the contacts G on the main controller, thence to the master controller and back to the battery. Line breaker LB' will therefore close and short-circuit the resistance R and in closing energize the "off" magnet of the electromagnetic valve 29, through the contacts 49. The energization of the "off" magnet causes the cam shaft to move a second step and the cam 50 to close the contacts 51, and short-circuit the two sections of resistance R' and R².

Upon the cutting out of each of the resistance sections R, R' and R² the motor current rises so that the throttle D will open the contacts 58 to prevent the controller being moved another step until the current drops to the proper value. It will be noted that when the controller starts to take a step, it will complete the step notwithstanding the fact that the throttle contacts through which the "off" magnet was energized are opened before the completion of the step. This is accomplished by the arrangement of contacts G and H which rotate with the cam shaft. The "off" magnet is energized through one of the contacts G and the throttle contacts 58 but as soon as the controller has started, circuit is made for the "off" magnet independently of the throttle contacts through one of the contacts H. This makes a circuit in parallel with the circuits through the throttle contacts, this parallel circuit being through contacts 38 and 44 on the potential relay B and overload relay OR respectively. The coil 56 is included in this circuit to assist the series coil and make the throttle more sensitive to changes of current. It is advisable that the advance of the controller be momentarily retarded at each operative position so as to prevent too rapid acceleration and prevent the controller moving through an operative position and causing a heavy rush of current at the next operative position. To take care of this, I insure that the current limit throttle will open its contacts 58 while the controller is moving from one step to another during acceleration. The shunt coil 56 cooperating with the series coil 57 will positively open the contacts 58 of the throttle D during the transition from one step to another, and then the throttle will close after the step is completed, responsively to the motor current. Furthermore, by means of this coil 56 the throttle D need only be calibrated for its drop out value, since the contacts 58 will be positively opened during the transition from one step to the other. The throttle may therefore open, but the movement of the cam shaft will not be interrupted until the circuit is interrupted at contact H and established on the second contact G, which, it will be observed, will be when the controller has completed a step to position $b'$. If, therefore, the current has not dropped to the proper value when the cam shaft has completed its step, it cannot take another step until the current does drop so as to energize the "off" magnet through the throttle contacts 58. When the current does drop to a proper value, the "off" magnet will again be energized to cause the cam shaft to take another step which short-circuits the resistance R³ through cam 50'. Again the throttle will prevent further movement of the controller until the current drops to proper value, whereupon another step will be taken by the cam shaft which will short-circuit the resistance R⁴. When the cam shaft moves to the next step ($b'$ on the main controller) in which the fields of the motors are tapped to give increased speed, the progression will stop, by reason of the fact that one of the contacts G, marked 52, is offset from the others so as to interrupt the circuit of the "off" magnet through both sets of contacts G and H. In order to progress further, it is necessary for the master controller to be moved to position $c$ in which the "off" magnet is energized through the contacts 53, on the master controller, and the contact 52 which engages with contact finger 54. The movement of the master controller to the position $c$, therefore, causes the cam shaft to take one step (to position $c'$) which changes the motor connections from full series with tapped or weakened field, which is the highest speed position in series, to the parallel position. When this position is reached, the progression is stopped by reason of the fact that the contact 54 passes over the contact 52. In order to progress further, it is necessary that the master controller be moved to the position $d$, in which the "off" magnet will be again energized in the regular way and the cam shaft moved forward step by step in the manner above described under the control of the throttle, until the full parallel position is reached.

The main controller will be returned to the "off" position at any time by the deenergization of the "on" and "off" magnets controlling the electromagnetic valves 28 and 29, respectively. If the power should fail, even for an instant, the potential relay will drop thereby deenergizing the "on" magnet at the contact relay 38 of the relay. It will be noted that this potential relay is energized and picked up through resistance $r'$ and the contact 36 in the "off" position of the main controller, but that as soon as the controller moves from "off" position the resistance $r''$ is cut into the circuit so as to reduce the current to a value which will maintain the relay closed but prevents it from picking up again in case it drops out, until the controller is returned to the "off" position.

The reverser RS is also interlocked with the main controller at contact 40 so that the valve magnets $f$ and $r$ can only be energized in the "off" position of the controller. The opening of the potential relay causes the opening of the line breaker LB which in turn causes the opening of the line breaker LB' and causes another break in the circuit of the "on" magnet so that the controller will be returned to "off" position.

I shall now describe the operation of the throttle or notching relay D whereby, in case the motor current is in excess of the value at which the throttle D is set to operate so as to open the contacts 58 and thereby arrest the further progression of the main controller M, an additional step may be taken despite the operation of the throttle, in opening up the contacts 58. It will be understood that in Fig. 3 the throttle D is shown very diagrammatically for the purpose of an easy understanding of my invention. Let it be assumed that the motor current at the first step $a'$ is in excess of the drop-out value of the throttle D, that the contacts 58 are therefore held open, and that it is desired to take another step irrespective of the operation of the throttle. By closing the normally open push button 59 the coil 60 of the notching relay will be energized from the battery E through a circuit including the master switch MC. The armature 61 will thereby be moved against its bias so as to make engagement with the extension 62 on the armature 69 of the throttle. The contacts 58 will thereupon be short-circuited through a circuit including the armature 69, the extension 62, the hook 64 on the armature 61, the armature 61, the armature 65 and the contacts 66. The off magnet is thereupon energized and the controller will advance one complete step and thereupon be arrested from further movement, since the coil 56 and the coil 67 which are in series will be energized at one of the contacts H, and the contacts 66 will be thereby opened, thus deenergizing the electromagnet 29 of the off magnet valve. The further advance of the controller is then arrested and the automatic progression will not begin as long as the push button 59 is held closed. Another step can be taken by releasing and then depressing the push button 59. However, but one step at a time can be taken for the reason that when the coil 67 is energized through one of the contacts H as the controller is advanced from one step to the next, and if the push button 59 is held closed throughout this entire step, the contacts 66 will remain open even though the coil 67 is deenergized after the controller has finished the step, since a part of the magnetic flux set up by the coil 60 will have a path through the armature 65, the core associated with the coil 67 and the plate 75, and this flux will be of sufficient strength to hold the armature 65 in its attracted position at which the contacts 66 are held open, control must therefore be temporarily restored to the current limit device before the progression can continue. The operator may likewise cause the controller to be advanced one position at a time in any of the other operative positions until the full parallel relation of the driving motors is established.

It will be obvious to those skilled in the art that my invention is likewise useful where it is desired to take a single motor accelerating step at any time, regardless of whether the motor current is above or below the drop-out value of the current limit throttle. In other words, by means of my arrangement, full automatic control or full manual control may be had for all or at any point in the control, as desired. Furthermore, if the line switches are deenergized so that the main motor circuits will not be energized, my invention provides means whereby the motor control circuits can easily be checked up, the motor controller being advanced step by step by depressing the releasing push button 59 in the manner previously explained.

In accordance with the provisions of the patent statutes, I have described the principle of operation of my invention, together with the apparatus which I now consider to represent the best embodiment thereof; but I desire to have it understood that the apparatus shown is only illustrative and that the invention can be carried out by other means.

What I claim as new and desire to secure by Letters Patent of the United States, is:—

1. The combination with a controller for starting electric motors, of a current limit device for causing a step by step advance of the controller under the control of the motor current, and manually controlled means for causing the controller to begin a step independently of the current limit device and after the step has been completed preventing the taking of further steps until the operator temporarily restores control to the current limit device by the operation of said manually controlled means.

2. The combination with a controller for starting electric motors, of a current limit device for causing a step by step advance of the controller under the control of the motor current, means whereby after a step has been begun the advance of the controller is rendered independent of the current limit device, and manually controlled means for causing the controller to begin a step independently of the current limit device and after the step has been completed, preventing the taking of further steps until the operator temporarily restores the control to the current limit device by the operation of said manually controlled means.

3. The combination with a controller for starting electric motors, of a current limit device for causing a step by step advance of the controller under the control of the motor current, manually controlled means for causing the controller to begin a step independently of the current limit device, and means for preventing the taking of a further step until the operator restores the control of the motor acceleration to the current limit device by the operation of said manually controlled means.

4. The combination with a controller for starting electric motors, of a current limit device for causing a step by step advance of the controller under the control of the motor current, means whereby after a step has been begun the advance of the controller is rendered independent of the current limit device, manually controlled means for causing the controller to begin a step independently of the current limit device, and an electromagnet energized during the taking of the step for preventing the taking of a further step until the control of the motor acceleration has been temporarily restored to the current limit device.

5. The combination in a current limit device having means energized responsively to the motor current for arresting the step by step acceleration of the motor until the motor current has dropped to a predetermined value, of manually controlled means for rendering ineffective the said means energized responsively to the motor current so as to permit a step to be taken at the will of the operator regardless of the value of the motor current, and means for preventing the taking of a further step until the operator restores control of the motor acceleration to the said means energized responsively to the motor current.

6. The combination in a current limit device of an electromagnet energized responsively to the motor current and contacts controlled thereby for arresting the automatic step by step acceleration of the electric motor until the motor current has dropped to a predetermined value, a second electromagnet and means controlled thereby for short circuiting the said contacts to permit a single acceleration step to be taken at the will of the operator regardless of the motor current, and means whereby after such a step has been taken the taking of further steps is automatically arrested until the operator restores control of the motor acceleration to the said electromagnet energized responsively to the motor current.

7. The combination in a current limit device of an electromagnet energized responsively to the motor current having means for arresting the automatic step by step acceleration of the electric motor until the current has dropped to a predetermined value, a manually controlled electromagnet having means whereby the energization of this electromagnet permits a single acceleration step to be taken at the will of the operator regardless of the value of the motor current, and means whereby after such a step has been taken the taking of further steps is automatically arrested until the said manually controlled electromagnet is deenergized.

8. The combination in a current limit device having means energized responsively to the motor current for arresting the step by step acceleration of the motor until the motor current has dropped to a predetermined value, of manually controlled means for rendering ineffective the said means energized responsively to the motor current so as to permit a step to be taken at the will of the operator regardless of the value of the motor current, and an electromagnet energized during the taking of the step for preventing the taking of a further step until the control has been restored to the said means energized responsively to the motor current.

9. The combination in a current limit throttle for causing a step by step acceleration of an electric motor, of a manually controlled electromagnet energized at the will of the operator for holding open the throttle contacts and establishing a short circuit around the same so as to cause a step to be taken independently of the throttle, an electromagnet energized during the taking of the step for opening the said short circuit around the throttle contacts, whereby after the step has been taken a further step cannot be taken until the operator temporarily deenergizes the manually controlled electromagnet to restore the control to the throttle.

10. In a system of control, the combination with a dynamo-electric machine, and means including a current relay for effecting an automatic series of operating steps of said machine, of means embodying a plurality of successively energized coils and adapted to be substituted for said relay device during inoperative conditions thereof to effect only one operating step irrespective of the duration of use of said substituting means.

11. In a system of control, the combination with a dynamo-electric machine, and means for effecting a series of operating steps of said machine, of a relay device for automatically rendering said means operative under normal conditions, and a second relay device dependent upon an external agency for initiating operation of said first-named means under certain machine-current conditions and further dependent upon such operation for nullifying the initial action of the device to positively prevent said first-named means from taking more than one step.

12. In a system of control, the combination with a dynamo-electric machine, and control means for effecting a series of operating steps of said machine, of a relay device energized in accordance with the machine current and having a plurality of contact members for automatically rendering said control means operative under normal conditions, and a second relay device having a plurality of normally de-energized actuating coils and armatures therefor, one of said coils being dependent upon an external agency for creating a magnetic flux instrumental in substituting the corresponding armature in a circuit bridging said contact members and a second coil being dependent upon the consequent operation of said control means for creating an additional flux to actuate the corresponding armature to interrupt said substitution circuit and arrest such operation after one step has been taken.

13. The combination with a circuit having a gap, and control means governed by closing the gap in said circuit, of a relay device dependent upon an external agency for creating a magnetic flux instrumental in connecting parts of the device across said gap and dependent upon the consequent operation of said control means for creating an additional flux to interrupt said connection and prevent the operation of said control means beyond a certain stage.

14. The combination with a circuit having a gap, and control means governed by closing the gap in said circuit, of a relay device having a plurality of normally de-energized actuating coils and armatures therefor, one of said coils being dependent upon an external agency for creating a magnetic flux instrumental in substituting the corresponding armature in a circuit bridging said gap and a second coil being dependent upon the consequent operation of said control means for creating an additional flux to actuate the corresponding armature to interrupt said bridging circuit and arrest such operation at a certain point.

15. A relay device comprising a plurality of solenoids, cooperating armatures severally having fulcrums, a plurality of terminal members for engaging the respective armatures under different conditions of the solenoids, and means for biasing one of said armatures out of contact with the corresponding terminal member.

In witness whereof, I have hereunto set my hand this 5th day of June, 1919.

JOHN F. TRITLE.